May 19, 1964 T. T. DAO 3,134,030
FLIP-FLOP CIRCUIT WITH A DELAY BETWEEN A LOGICAL INPUT CIRCUIT AND THE FLIP-FLOP
Filed Aug. 2, 1961
2 Sheets-Sheet 1

INVENTOR
Tich T. Dao
BY Louis A. Kline
John J. Matlago
Richard T. Kempel
His Attorneys May 19, 1964 T. T. DAO 3,134,030
FLIP-FLOP CIRCUIT WITH A DELAY BETWEEN A LOGICAL INPUT CIRCUIT AND THE FLIP-FLOP
Filed Aug. 2, 1961 2 Sheets-Sheet 2

Inventor
TICH T. DAO
BY Louis A. Kline
John J. Matlago
Richard J. Kengel
His Attorneys 3,134,030

FLIP-FLOP CIRCUIT WITH A DELAY BETWEEN A LOGICAL INPUT CIRCUIT AND THE FLIP-FLOP

Tich T. Dao, Gardena, Calif., assignor to The National Cash Register Company, Dayton, Ohio, a corporation of Maryland Filed Aug. 2, 1961, Ser. No. 128,867
5 Claims. (Cl. 307—88.5)

Figure 1:
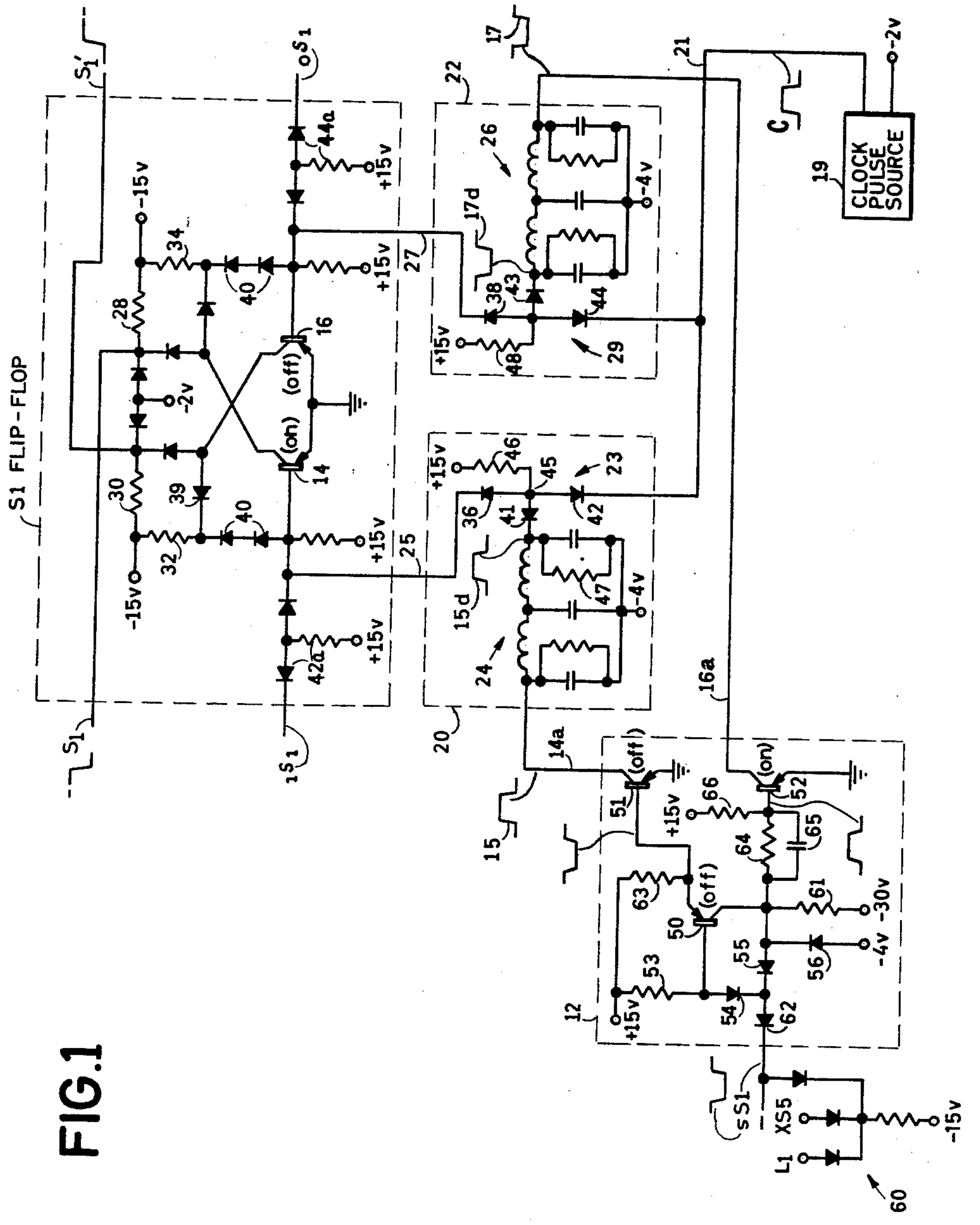

The present invention is directed to flip-flop circuits and more particularly to improved circuit arrangements for controlling the triggering of flip-flop circuits.

The improved circuit arrangements are directed primarily to the control of the triggering of flip-flops interconnected in logical circuits of systems such as those disclosed in a copending U.S. patent application of Robert O. Gunderson et al., filed on May 2, 1961, Serial No. 107,109 entitled Computer System and assigned to the same assignee. In logical circuits of these systems, the output of one flip-flop forms a part of the logic which is the input of another flip-flop. Consequently, when a clock pulse occurs which operates to gate the logical input of one flip-flop to change its output, the input to another flip-flop is often changed during the same clock pulse. In order to prevent retriggering as a result of the change in the input to the latter flip-flop during a clock pulse, the triggering of the latter flip-flop must be made independent of the input during the period of the clock pulse. Many of the factors contributing to retriggering of flip-flops interconnected in logical circuits have been discussed in detail in another copending U.S. patent application of Robert O. Gunderson et al., filed on July 14, 1961, Serial No. 124,205, entitled Flip-Flop Circuit Arrangement and assigned to the same assignee.

The improved circuit arrangements of the present invention provide for controlling flip-flops in a manner which prevents retriggering while being capable of providing higher speed operation than many prior known circuit arrangements of this type. In these prior circuit arrangements, the speed is limited by the time required to store and discharge a charge Q which is the charge required to trigger the flip-flop. In the present circuit arrangements, the speed of the flip-flop circuit is not limited in this manner and the circuit arrangements provide for significantly higher speed operation. Although, the description which follows, describes the operation of the circuit of the present invention at speeds comparable to those of prior circuit arrangements, (e.g., 2 megacycles), it will be clear that the speed of this circuit is not limited to this speed of operation.

It is an object of the present invention, therefore, to provide a flip-flop circuit arrangement having the foregoing features and advantages.

Another object of the present invention is the provision of flip-flop circuit arrangements which prevent retriggering.

A further object of the present invention is to provide for triggering of a transistor flip-flop by gating a triggering signal by a delayed logical pulse and a gating pulse.

Another object of the present invention is to provide a flip-flop circuit arrangement to selectively pass a high potential level pulse through either one or the other of a pair of delay lines according to a true or false logical potential level of a signal supplied from a logical circuit to produce a triggering signal for placing the flip-flop in a state corresponding to the signal supplied from the logical circuit.

Still another object of the present invention is to provide for triggering a flip-flop into either one or the other of two logical states corresponding to either one potential level or another of a logical signal by a triggering signal produced by either one gate in response to a delayed pulse and a gating pulse or another gate in response to a delayed pulse and a gating pulse.

Another object of the present invention is to provide a transistor circuit responsive to a single input signal to produce complementary logical output signals.

Figure 2:
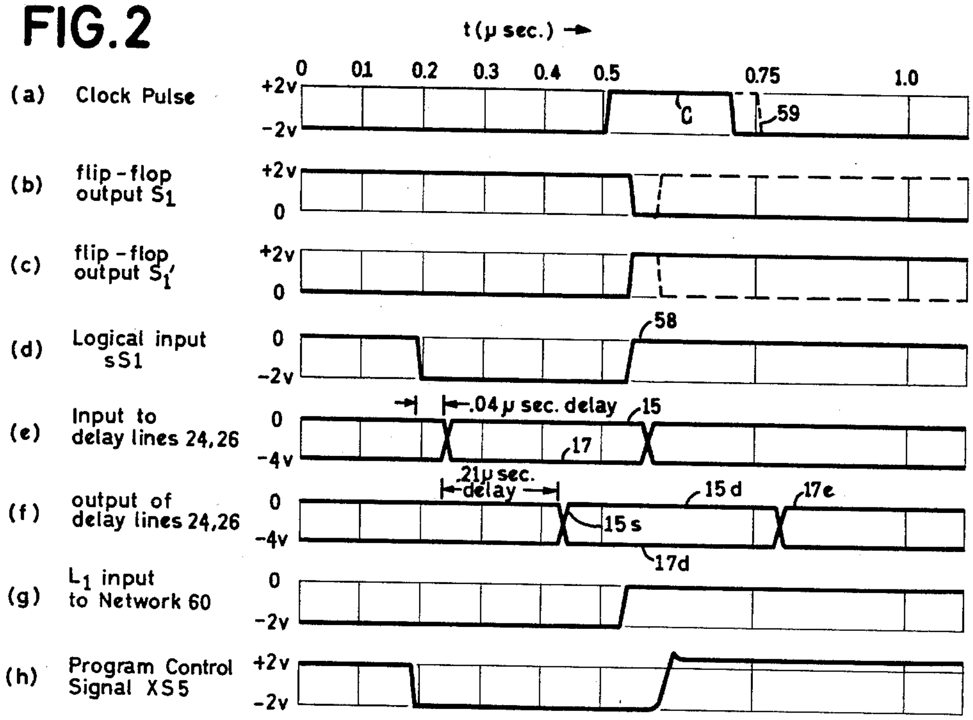
Figure 1A:
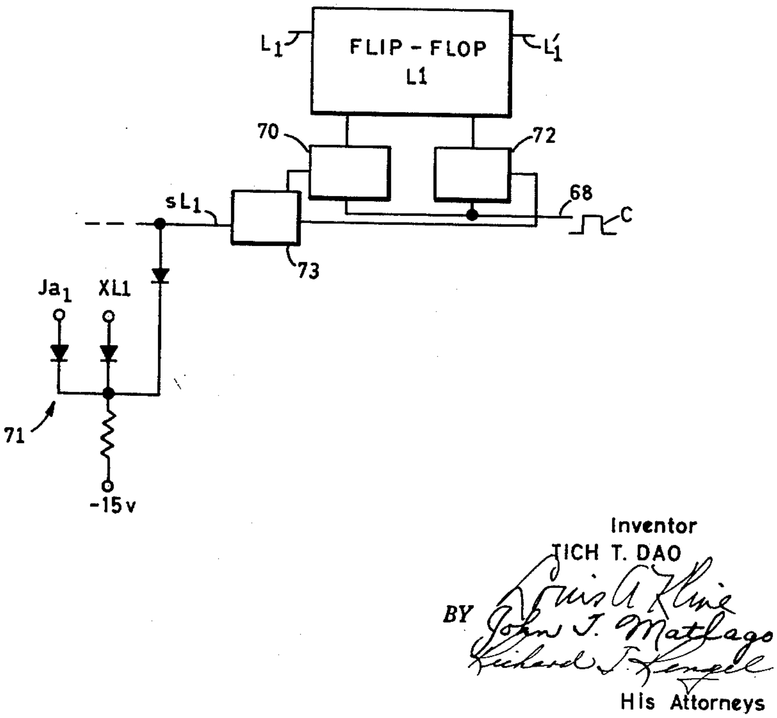

Other objects and features of the invention will become apparent to those skilled in the art as the disclosure is made in the following detailed description of a preferred embodiment of the invention as illustrated in the accompanying sheets of drawings in which:

FIG. 1 is a circuit diagram of the flip-flop circuit arrangement of the preferred embodiment of the invention and a typical logical network coupled to the single logical input of the flip-flop;

FIG. 1*a* is a block diagram of another flip-flop circuit arrangement similar to the circuit arrangement of FIG. 1 which is shown to illustrate the operation of the present invention interconnected in a logical circuit;

FIG. 2 illustrates various voltage waveforms produced in the operation of the present invention.

Referring now to the drawings which illustrate the preferred embodiment of the invention, there is shown in FIG. 1, a flip-flop circuit arrangement including a flip-flop S1, clock gating circuits 20 and 22, and a single input circuit 12. The flip-flop S1, as shown in FIG. 1, is in its false state wherein a first transistor 14 is "turned on" and a second transistor 16 is "turned off." The flip-flop S1 is triggered into its true state from its false state by a triggering signal applied to the base of the transistor 14 from a triggering input 25 which "turns off" transistor 14, and "turns on" transistor 16.

The triggering signal for placing the flip-flop S1 in its true state is supplied by the clock gating circuit 20 in response to a high potential level pulse 15 (0 volts) (FIG. 2(*e*)) and a clock pulse C (FIG. 2(*a*)). The pulse 15 is produced in an output 14*a* of single input circuit 12 in response to a true, low potential signal (−2 volts) at the logical input *s*S1. The clock pulse C is supplied at a predetermined repetition rate by a clock pulse source 19 which is connected to a clock input 21 for the flip-flop S1. The clock input 21 is connected to both clock gating circuits 20 and 22 to provide one of two inputs to each of the clock gating circuits 20 and 22. The logical pulse 15 is delayed by a delay line 24 in the clock gating circuit 20 to provide a delayed high potential level pulse 15*d* (FIG. 2(*f*)) which remains at a high potential level (0 volt) at least during the same time period of the clock pulse C. As shown in FIG. 2(*f*), the delayed pulse 15*d* rises to a high potential prior to the clock pulse C and remains high until after the fall of the clock pulse C, to allow for possible additional delay of the rise of pulse 15*d* and a wider clock pulse or a late clock pulse which falls as indicated by the dotted line 59 in FIG. 2(*a*). A true triggering signal is produced at triggering input 25 only during the time interval both pulses 15*d* and C are being applied to respective inputs of a true "and" gate 23 which includes product diodes 41 and 42. The current for the true gate 23 is supplied through a resistor 46 from a positive voltage source (+15 volts), as shown. In order to place the flip-flop S1 in the false state from a true state in response to signals coupled to the logical input *s*S1, the other clock gating circuit 22, connected to the output 16*a* of the single input circuit 12, produces a false triggering signal (not shown) at triggering input 27 during a clock pulse C when a false, high level potential signal (O*v*) is applied to the logical input *s*S1 during the time period between 0.2 and 0.5 microsecond. Additional inputs, set input $_1s_1$ and reset input $_0s_1$, as shown in FIG. 1, provide for direct control of the state of the flip-flop S1 by application of a positive pulse (+2 volts) to one or the other of the inputs as desired.

Having briefly considered the general arrangement of the flip-flop circuit and the manner in which it operates in changing from a false state to a true state and vice versa, the individual circuits shown in FIG. 1 will be considered in detail. The bistable circuit or the flip-flop S1 alone, without the remainder of the circuit arrangement shown in FIG. 1, comprises a pair of cross-coupled transistor current switching circuits in which the transistors 14 and 16 are alternately "turned on" and driven into saturation during normal operation over a period of time involving successive regeneration cycles. Collector load resistors 28 and 30 connect the respective collectors of transistors 14 and 16 to the collector supply voltage (−15 volts) through diodes, as shown, to provide the required load current. The flip-flop outputs $S_1$ and $S_1'$ are limited in their negative excursions (−2 volts) by a clamping circuit including diodes connecting these outputs to a clamping voltage source (−2 volts), as shown. Separate base current resistors 32 and 34 connect the base-collector circuits to the collector supply voltage (−15 volts), as shown.

Individual pairs of voltage level shifting diodes 40, shown connected in the cross-coupling circuits of transistors 14 and 16, adjust the voltage level at the bases of transistors 14 and 16 to provide a reverse bias across the base-emitter junction (e.g., +0.5 volt) of the transistor 14 or 16 which is "turned off" for "latching" the flip-flop S1.

Input networks 42*a* and 44*a* are provided for the set input ${}_1s_1$ and reset input ${}_0s_1$, respectively. A signal coupled to the set input ${}_1s_1$ or reset input ${}_0s_1$ is a positive going pulse (e.g., −4 volts to +2 volts). Pulses applied to either the input network 42*a* or 44*a* are coupled directly to the base of the transistor 14 or the base of the transistor 16, respectively, to either turn the respective transistor off or maintain it off, depending upon its state.

The clock gating circuitry for each of the triggering inputs 25 and 27 of the flip-flop S1, as shown in FIG. 1, includes a delay line and an "and" gate. Since the clock gating circuits 20 and 22 are identical in construction only the clock gating circuit 20 will be described in detail. The clock gating circuit 20 includes the true "and" gate 23 which operates to produce a triggering signal when the delayed high potential level pulse 15*d* (FIG. 2(*f*)) applied to one input of gate 23 arrives during the time interval the clock pulse C is being applied to the other input of gate 23.

In order to trigger the flip-flop into a state corresponding to a true, low potential level of the signal at the logical input *s*S1 (FIG. 2(*d*)) prior to the clock pulse C (FIG. 2(*a*)) the true logical signal is delayed by .21 microsecond by the delay line 24 to provide the delayed high potential level pulse 15*d* at the logical input of true gate 23 which remains at a high potential level (0 volt) at least during the entire time period of the clock pulse C.

The potential level of the signal at the logical input *s*S1 (FIG. 2(*d*)) is controlled so that it does not change in the .3 microsecond time interval (.2 to .5 microsecond) before the clock pulse C (FIG. 2(*a*)). Assuming that the typical clock pulse width, in time, is .2 microsecond, as illustrated in FIG. 2(*a*), then a total delay of approximately .2 microsecond of the true signal at the logical input *s*S1 having a minimum width of .3 microsecond would provide complete overlap in time of the clock pulse C (FIG. 2(*a*)) by the delayed high potential level pulse 15*d* which corresponds in length to the true, low potential level signal. In order to reduce the circuit requirements for controlling the timing of the clock pulse C, a time period of .25 microsecond between 0.5 and 0.75 is provided for tolerance for variations in timing, e.g., late clock pulses and/or width of the clock pulses. The end of the time period for clock pulses is indicated in FIG. 2(*a*) by the dotted line 59. A total delay of .25 microsecond is required to assure overlap of the delayed pulse 15*d* and the period for clock pulses. A "lumped constant" delay line, properly terminated at each end as shown in the clock gating circuits 20 in FIG. 1, having a time delay of .21 microsecond will provide an adequate time delay to provide sufficient overlap of the clockpulse time period by the delayed pulse 15*d*. The remainder of the total time period of delay (.04 microsecond) is produced in the single input circuit 12 as indicated by the signal waveform in FIG. 2(*e*). The maximum tolerable delay of the single input circuit 12 is .1 microsecond. A longer time delay than .1 microsecond would place the rise in voltage 15*s* of the delayed pulse 15*d* (FIG. 2(*f*)) after the rise of the clock pulse C (FIG. 2(*a*)). Changes in potential level of the delayed high potential level pulse 15*d* during the time period of the clock pulse C are avoided to prevent retriggering of the flip-flop S1 by triggering signals produced in the other clock gating circuit 22 as a result of the different logical potential levels occurring within the gating period of the clock pulse C.

The triggering signal current is provided by a current source including a resistor 46 and the positive supply source (+15 volts). During the time period the clock pulse C is applied to the clock input 21 and the delayed high potential pulse 15*d* is applied to the logical pulse input of the true gate 23, the current through resistor 46 is steered into the triggering input 25 to "turn off" transistor 14 to change the state of the flip-flop S1 from a false state to a true state. Prior to the arrival of the delayed logical pulse 15*d* and the clock pulse C, i.e., prior to the rise in voltage 15*s* as illustrated in FIG. 2(*f*), the current supplied from the gate current source through resistor 46 is directed to a lower negative voltage source (−4 volts) connected to the delay line 24 through a primary gate current path via diode 41 and a resistor 47. During this time interval, the voltage at node 45 is lowered below ground, i.e., made negative, which produces a reverse bias across diode 36 to block current flow into triggering input 25 of the flip-flop S1.

Upon arrival of the delayed high potential level pulse 15*d*, i.e., at the rise in voltage 15*s* as illustrated in FIG. 2(*f*), the current path through diode 41 is blocked and the current through the resistor 47 to the lower negative voltage source (−4 volts) is supplied from a transistor 51 in the single input circuit 12 via the delay line 24. Transistor 51 is "turned on" as a result of the true, low potential logical signal coupled to the logical input *s*S1 to produce the high potential level pulse 15 (0 volts) which is delayed to provide the delayed pulse 15*d*. The blocking of the current path through diode 41 directs the current through an alternate gate current path including diode 42, the clock input 21, and the clock pulse source 19 to the higher negative voltage source (−2 volts). Since only the logical pulse input to the true gate 23 has been blocked by delayed pulse 15*a*, node 45 remains negative to continue to produce a reverse bias across diode 36 to prevent triggering current from being steered into the triggering input 25.

Upon arrival of the clock pulse C at the clock input 21, the alternate current path for the current through resistor 46 is blocked and the current through resistor 46 is steered into the triggering input 25 to trigger the flip-flop S1 into its true state, i.e., "turn off" transistor 14 and "turn on" transistor 16. After transistor 14 is "turned off" by the triggering signal current and before the flip-flop S1 has "latched," i.e., transistor 16 has "turned on" to place the flip-flop S1 in a stable state; the amplitude of the triggering current fed into the triggering input 25 decreases because of the increase in impedance of base-emitter junction when transistor 14 is "turned off." If the resulting rise in voltage at node 45 exceeds the required forward bias of the diode 41, the excess current from resistor 46 will flow through the primary current path via diode 41 and resistor 47 to the negative voltage source (−4 volts).

During the time interval the clock gating circuit 20 produces a triggering signal to trigger the flip-flop S1 into its true state, the clock gating circuit 22, i.e., delay line 26 delays the false, high potential level signal 58 (FIG. 2(*d*)) applied to the logical input *s*S1 during the time period of the clock pulse C to prevent retriggering and outputs shown in dotted lines in FIGS. 2(*b*) and 2(*c*). The level of signal 58 reflects the changing of the input $L_1$ from a low to a high level potential (FIG. 2(*g*)). The delay line 26 in the clock gating circuit 22 delays the output 16*a* to prevent the resulting high level pulse 17*e* (FIG. 2(*f*)) from being applied to the logical input of the false gate 29 during the time period the clock pulse C is being applied to the clock input 21. The pulse 17 (FIG. 2(*e*)), which is applied to the input of delay line 26 of the clock gating circuit 22 from the output 16*a* of the single input circuit 12, provides a delayed low level pulse 17*d* (FIG. 2(*f*)) at the logical pulse input to the false gate 29 during the clock pulse C (FIG. 2(*a*)). During the time interval clock pulse C blocks the current path through diode 44 to the clock input 21, pulse 17*d* maintains a forward bias across the diode 43 and current flow through the primary current path from resistor 48 and the positive voltage source (+15 volts) to the lower negative voltage source (−4 volts), as shown in FIG. 1. As long as current is permitted to flow through the primary current path in the clock gating circuit 22 during the clock pulse C, no triggering signal is applied to the triggering input 27 to retrigger the flip-flop S1 by the false, high potential level signal 58 at the input *s*S1.

The single input circuit 12 has a single input *s*S1 which is coupled to the outputs of a logical circuit including a diode gating network 60 providing the logical signals controlling the state of the flip-flop S1. The single input circuit 12 has two complementary logical outputs 14*a* and 16*a* providing complementary and approximately symmetrical signals, e.g., pulses 15 and 17 shown in FIG. 2(*e*) which are coupled to the inputs of delay lines 24 and 26, respectively. The single input circuit 12 provides two complementary outputs from a single input with a minimum of time delay. The logical signals coupled to the logical input *s*S1 and transistor 50 produce complementary driving signals to current driver circuits including driver transistors 51 and 52, respectively. The driver transistors 51 and 52 amplify the signals coupled to their respective bases to provide complementary logical pulses 15 and 17 which are capable of passing through delay lines 24 and 26 respectively, to operate true gate 23 to produce a triggering signal at the triggering input during the clock pulse C (FIG. 2(*a*)). A minimum of direct current bias is provided by resistors 64 and 66 so that driver transistor 52 is operated at the edge of its region of saturation (barely saturated) to provide a pulse of sufficient amplitude, such as pulse 17, which will pass through delay line 26. By limiting the operation of the driver transistor 52 to just within the region of saturation, the complementary output signals are more closely symmetrical because of the faster time of response of the transistor 52 in "turning off," e.g., at the beginning of pulse 17, due to the smaller storage time, i.e., smaller storage time than when operating further in the region of saturation. The driver transistor 51 is operated in the same manner as driver transistor 52 by the proper choice of bias resistors 61 and 63 to provide complementary logical output signals which are approximately symmetrical.

The base-emitter circuit of the transistor 50 which couples the base of the transistor 50 to the logical input *s*S1 comprises a resistor 53 connecting the base of transistor 50 to the positive voltage source (+15 volts) which provides the current necessary to "turn off" the transistor 50 when the signal at the logical input *s*S1 is at a high logical potential level (0 volt). Current through resistor 53 also provides the current necessary for biasing a silicon diode 54. The diode 54 adjusts the potential level to maintain the transistor 50 "turned off" when the signal of the logical input *s*S1 is at the false, high potential level. The lower end of diode 54, as shown in FIG. 1, is connected to the emitter of transistor 50 through a diode 55 which, in combination with silicon diode 54, adjusts the potential level of the collector of transistor 50 below the base voltage to prevent the transistor 50 from operating in its region of saturation. In preventing transistor 50 from operating in its region of saturation, the time of response of the transistor 51 is decreased to provide complementary output signals which are approximately symmetrical. The lower potential level at the emitter of transistor 50 is clamped at a −4 volts by a clamping circuit including a diode 56 connecting this emitter to the negative voltage source (−4 volts). A voltage adjusting diode 62 provides the necessary shift of the potential level at the logical input *s*S1 to maintain the transistor 50 "turned off" when the logic coupled to the input *s*S1 is at the false, high logical potential level.

In the input circuit to driver transistor 51, the bias resistor 63 connects the base to the positive voltage source (+15 volts) to supply the bias current necessary to "turn off" transistor 51 and the current required to provide a reverse bias across the base-emitter junction of transistor 51 to maintain the transistor 51 "turned off" when transistor 50 is "turned off." The bias resistor 61 connects the collector of transistor 50 and the base of transistor 52, through the bias resistor 64 and a capacitor 65 in parallel, to a negative voltage source (−30 volts). The current through the resistor 61 provides the required D.C. and "turn on" base current for the transistor 52 and also the minimum required D.C. base current for the transistor 51. The resistor 61 also provides a current path for the maximum collector current of transistor 50, the maximum current through two biasing resistors 64 and 66, and the maximum leakage current of diode 55 without raising the collector potential of the transistor 50 above the clamp voltage (−4 volts). The capacitor 65, which by-passes the biasing resistor 64, is selected to provide a sufficient charge at the base of transistor 52 to "turn off" and "turn on" the transistor 52. In practice the value of the capacitor is determined by the required rise and fall time of the output of the transistor 50 and the input circuit to transistor 52 is arranged accordingly.

In the single input circuit 12, the collector of transistor 50 is connected to the base of driver transistor 52. In supplying both inputs for driver transistors 51 and 52, the difference in build up of current in the emitter and collector circuits of transistor 50, i.e., slower build up of current in the collector circuit of transistor 50, is compensated for by the parallel resistance-capacitance circuit connection to the base of the transistor 52, i.e., in by-passing the resistor 64 by the capacitor 65. The capacitor 65 integrates the current supplied by the collector on the transistor 50 to decrease the effective rise time of the signal current coupled to the base of transistor 52.

The logical circuit coupled to the logical input *s*S1 is illustrated by the logical network 60 which consists of a standard current mode diode logic gate having product diodes for each of the inputs $L_1$ and XS5, a sum diode connecting the logical network to the logical input *s*S1 and a current limiting resistor connecting both of the product diodes and the sum diode to the negative voltage source (−15 volts). The logical network 60, as shown, provides logical potential levels at the logical input *s*S1, a false high potential level of approximately zero (0) volt and a true lower potential of approximately minus two (−2) volts. When a false high potential level signal is coupled to the logical input *s*S1 both transistors 50 and 51 are "turned off" and transistor 52 is "turned on." Sufficient base current is supplied to transistor 52 to cause transistor 52 to operate in its region of saturation (near the edge of saturation) since the collector of transistor 50 is clamped at approximately minus four (−4) volts.

As the logical potential level of the logical input $sS1$ changes to the true, lower logical potential level (—2 volts), as illustrated by the waveform in FIG. 2*d*, transistor 50 is "turned on" to provide sufficient current to the transistor 51 to drive it into saturation (operating in and near the edge of its region of saturation). When transistor 50 is "turned on," its collector voltage rises which "turns off" transistor 52 and maintains it "turned off" during the time interval transistor 50 remains "turned on" as controlled by the direct current biasing network including resistors 64 and 66. The complementary output pulses 15 and 17 of the driver transistors 51 and 52 are indicated in FIG. 2*e*, i.e., inputs to the delay lines 24 and 26. When the signal at the logical input $sS1$ returns to the false high potential level, indicated by reference number 58 in FIG. 2*d*, the base of transistor 50 is driven positive again to "turn off" the transistor 50. Because the transistor driver 51 is operating in its region of saturation at the time transistor 50 is "turned off," the emitter of transistor 50 does not immediately follow the voltage swing at its base and the base-emitter junction of the transistor 50 is reverse biased. During this interval of time in which the base-emitter junction of transistor 50 is reverse biased, all of the current supplied through resistor 63 is switched into the base of the transistor 50. At this instant, the collector of transistor 50 provides the current necessary to "turn on" the transistor 52 through the capacitor 65. The by-pass capacitor 65 decreases the time necessary to "turn on" the transistor 52 and the transistor 52 is maintained "turned on" by the direct current bias provided when transistor 50 is "turned off."

The input $L_1$ of the logical network 60 is supplied by the true output of the flip-flop L1 (FIG. 2(*g*)). The input XS5, program control signal, has a waveform illustrated in FIG. 2(*h*). The network 60 having these inputs illustrates the interconnection of the typical flip-flops in different registers by logical circuitry. The program control signal XS5 is supplied from the program control signal source which has not been shown since it is unnecessary in the understanding of the present system. The flip-flop L1 is assumed to be in a true state initially, as illustrated by the waveform in FIG. 2(*g*). As indicated in FIG. 2(*g*), the logical potential level of the input $L_1$ changes from the true, low potential level to the false, high potential level shortly after the rise of the clock pulse C at 0.5 microsecond. The change in state of the flip-flop L1 from true to false follows the change in the logical potential level of the signal coupled to the logical input $sL1$ which it is assumed has changed to false and all the other outputs of logical networks coupled to the logical input $sL1$ are false.

The flip-flop L1 is shown in block diagram and can be the same as illustrated in FIG. 1 for the flip-flop S1. The circuit for flip-flop L1 includes clock gating circuits 70 and 72, single input circuit 73, and a clock input 68, all of which circuits are the same as shown in FIG. 1 for the the flip-flop S1. A typical logical network 71, having inputs $Ja_1$ and $sL1$, is illustrative of the logical networks coupled to the logical input $sL1$ for the flip-flop L1 to control its state. The clock pulse C (FIG. 2(*a*)) applied to the clock input 68 and clock gating circuits 70 and 72 triggers the flip-flop L1 from a true state to a false state to correspond to the false, high potential level (0 volt) at the logical input $sL1$ to produce the change in the logical potential level from low to high at the output $L_1$ of the flip-flop L1 and the corresponding input $L_1$ to the network 60 (FIG. 1).

The operation of the flip-flop circuit shown in FIG. 1 in response to the signal at the logical input $sS1$, shown in FIG. 2(*d*), will now be described. At the time, 0 microsecond, when the potential level at the logical input $sS1$ is high (false), the transistors 50, 51, and 52 are operating as indicated in FIG. 1. At the time 0.2 microsecond, the poential level of the signal coupled to the logical input $sS1$ changes from a high to a low level (false to true) and the signal at the logical input $sS1$ remains at this level until after the rise of the clock pulse C (FIG. 2(*a*)). Shortly after the rise of the clock at 0.5 microsecond, the logical potential level changes from low to high as indicated by the reference number 58 in FIG. 2(*d*). This change in level 58, which occurs after the rise of the clock pulse C, does not effect the triggering of, or change the resulting state of the flip-flop S1 because of the time delay provided by the delay line 26 in clock gating circuit 22 for reasons which will be clear later on in the description.

The true, low potential level of the signal coupled to the logical input $sS1$ between 0.2 and 0.5 microsecond produces pulses 15 and 17 at outputs 14*a* and 16*a* and at inputs to delay lines 24 and 26, as shown by the waveforms in FIG. 2(*e*). The changes in level of the outputs 14*a* and 16*a*, i.e., pulses 15 and 17, resulting from the change in level of the signal at the logical input $sS1$ are delayed by .04 microsecond in the single input circuit 12. However, as indicated, the time delays of both outputs 14*a* and 16*a* are approximately the same and the pulses 15 and 17 are approximately symmetrical, complementary logical output pulses. There is a tendency of pulse 15 to overlap in time the pulse 17. This is controlled by minimizing the direct current bias necessary to operate the driver transistors 51 and 52 in the manner described. Increasing the direct current bias by decreasing the resistance of bias resistors 61, 63, 64, and 66 will produce overlap in time of the pulse 15 with respect to pulse 17. This overlap can have many advantages in other circuit arrangements such as in "exclusive or" circuits in logical adder circuits to eliminate noise pulses, e.g., during concurrent changes of two complementary inputs of an "and" gate. In the present arrangement, however, a minimum of overlap is desired and complementary pulses 15 and 17 which are approximately symmetrical are desired. Therefore, the direct current bias supplied through the bias resistors to transistors 51 and 52 should be the minimum current required for providing the operation as described, i.e., operation on the edge of the region of saturation.

The pulses 15 and 17 are delayed in the respective delay lines 24 and 26 to provide the delayed pulses 15*d* and 17*d* at the logical inputs to the true and false gates 23 and 29, respectively. The time periods of the delayed logical pulses 15*d* and 17*d* overlap the time period of the logical clock pulse C (FIG. 2(*a*)). The combination of the delayed high potential level logical pulse 15*d* and the clock pulse C coupled to the respective inputs of the true gate 23 produces a triggering signal which is applied to the triggering input 25 to "turn off" the transistor 14. The delayed logical pulse 17*d*, because it is a low level potential pulse, does not actuate gate 29 even though the clock pulse C is applied to the clock input of the false gate 29. The potential levels at both logical and clock inputs of either the true gate 23 or the false gate 29 must be at a high potential level in order to produce a triggering signal at the respective triggering input 25 or 27 of the flip-flop S1. When the logical pulse 17*d* returns to the high potential level, as shown in FIG. 2(*f*) by reference number 17*e*, the clock pulse C is no longer being applied at the clock input 21, therefore, no triggering signal will be produced at the triggering input 27 in response to the high potential level signal 58 at the logical input $sS1$ as shown in FIG. 2(*d*).

The time duration of the triggering signal applied to the triggering input 25 of flip-flop S1 which "turns off" the transistor 14 is adequate to provide for "latching" the flip-flop S1. The transistor 16 is "turned on" during the triggering signal and its output is cross-coupled to the base of the transistor 14 to maintain the transistor 14 "turned off." The "turning off" of transistor 14 and "turning on" of transistor 16 places the flip-flop S1 in its true state to provide a low level logical potential at the output $S_1$ and a high level logical potential at the inverted output $S_1'$.

In triggering the flip-flop S1 from a true state to a false state as a result of a false, high logical potential level coupled to the logical input *s*S1 during the time period of 0.2 to 0.5 microsecond of a regeneration cycle (not shown), the complementary outputs of single input circuit 12 produce a low potential level logical pulse at output 14*a* and high potential level logical pulse at output 16*a*, i.e., pulses 15 and 17 inverted. The logical pulses are delayed in the respective delay lines 24 and 26. The delayed high potential level pulse (pulse 17 inverted) is coupled to the false gate 29 which produces a triggering signal at the triggering input 27 of the flip-flop S1 during the current clock pulse C (not shown). The triggering signal "turns off" transistor 16 and "turns on" transistor 14 to place the flip-flop S1 in a false state.

In the light of the above teachings, various modifications and variations of the present invention are contemplated and will be apparent to those skilled in the art without departing from the spirit and scope of the invention.

What is claimed is:

1. A flip-flop circuit arrangement comprising: flip-flop circuit means including a first transistor and a second transistor; logical input circuit means having a single logical input and first and second outputs, said logical input circuit means being responsive to logical signals coupled to said single input circuit to produce complementary high and low level logical signals at said first and second outputs; a source of gating pulses; and first and second gating circuit means coupled to said first and second transistors, respectively each of said gating circuit means including a delay line and a logical gate, said delay line having an input coupled to a respective one of said first and second outputs for delaying a respective one of the complementary logical signals, said logical gate having an output coupled to a respective one of said transistors, a logical input coupled to the output of the respective delay line and a gating pulse input coupled to said source of gating pulses, said logical gate being responsive to a delayed high level logical signal coupled thereto and a gating pulse to produce a triggering signal at the respective first transistor or second transistor for placing the flip-flop into a state corresponding to the logical signal coupled to the single input circuit prior to the gating pulse.

2. A flip-flop circuit arrangement comprising: flip-flop circuit means having true and false bistable states including first and second transistor switching circuits each having a triggering signal input; first and second clock gating circuit means for producing triggering signals, said clock gating circuit means having outputs coupled to the respective triggering signal inputs of said first and second transistor switching circuits, each of said clock gating circuit means including a logical gate having a clock pulse input and logical pulse input and a delay line connected to the logical pulse input for passing all logical pulses applied thereto, said delay line comprising at least one series inductive element and one parallel capacitive element, said logical gate being responsive to a combination of a delayed high potential level logical pulse and a high potential level clock pulse applied to respective inputs thereof to produce a triggering signal at the respective triggering signal input; a source of high potential level clock pulses having a predetermined repetition rate coupled to said clock input; and logical input circuit means having a single logical input and first and second complementary logical outputs coupled to the delay lines in said first and second clock gating circuits, respectively, said logical input circuit means being responsive to logical signals coupled to said single input to produce complementary high and low potential level logical pulses at said complementary outputs.

3. A flip-flop circuit arrangement comprising: flip-flop circuit means having true and false bistable states including a first transistor switching circuit which is conducting current when the flip-flop is in a logical false state and a second transistor switching circuit which is conducting current when the flip-flop is in a logical true state; first and second clock gating circuits coupled to said first and second transistor switching circuits, each of said clock gating circuits including a logical gate having a delayed logical pulse input, a gating pulse input, and a delay line coupled to the logical pulse input; and logical input circuit means having a single logical input and first and second complementary logical outputs, said logical input circuit means being responsive to low potential logical signals coupled to said single input to produce complementary high and low potential level logical pulses which are approximately symmetrical, said first and second complementary logical outputs being connected to the delay lines in said first and second clock gating circuits, respectively, to pass and thereby provide delayed complementary high and low potential level logical pulses which are delayed for a time interval approximately equal to the time period of a high potential level gating pulse applied to the gating pulse inputs, whereby the combination of the delayed high potential level logical pulse and a high potential level gating pulse at the delayed logical pulse and gating pulse inputs of only a predetermined one of the logical gates produces a triggering signal for triggering the flip-flop circuit into a state corresponding to the low logical potential level of the signal coupled to said single logical input prior to the gating pulse.

4. A logical circuit arrangement comprising: a plurality of flip-flop circuit means each including a first transistor and a second transistor and complementary flip-flop outputs; logical input circuit means for each flip-flop circuit, each of said logical input circuit means including a single logical input and first and second complementary outputs responsive to true and false logical signals coupled to said single logical input to produce complementary logical output pulses at said first and second outputs, respectively; logical circuit means interconnecting said flip-flop circuit outputs and said single inputs to perform logical operations; first and second clock gating circuit means for said first and second transistors, respectively, of each flip-flop circuit, each of said clock gating circuit means comprising a logical gate and a delay line connecting the respective one of said first and second complementary outputs to said gate; a source of clock pulses; and clock pulse circuit means connecting said logical gates of said first and second clock gating circuit means to said source of clock pulses for blocking the gate current path to said source during the time interval of said clock pulses, whereby the gate current of gates supplied predetermined one of the logical signals from their respective delay lines during the time interval of the clock pulses is steered into the respective first or second transistors for triggering the respective flip-flops into a true or false state according to the true or false logical signals coupled to the respective single logical inputs in the time interval immediately prior to each clock pulse.

5. A flip-flop circuit arrangement comprising: flip-flop circuit means having true and false bistable states including a first transistor switching circuit which is conducting current when the flip-flop is in a logical false state and a second transistor switching circuit which is conducting current when the flip-flop is in a logical true state; first and second clock gating circuits coupled to said first and second transistor switching circuits, each of said clock gating circuits including a logical gate having a delayed logical pulse input and a gating pulse input, and a lumped constant delay line coupled to said logical pulse input to delay all changes in voltage level of logical signals coupled thereto; and logical input circuit means having a single logical input and first and second complementary logical outputs, said logical input circuit means comprising a single logical input transistor having a collector, a base, and an emitter, and a pair of driver transistors each having a collector, a base, and an emitter; direct current circuit means for said single logical input transistor including logical input circuit means for coupling true or false logical signals to the single logical input transistor to produce complementary logical output signals at its emitter and collector; and circuit means for said driver transistors including direct current input circiut means connecting the emitter of the single logical input transistor to the base of one driver transistor and A.C. current input circuit means coupling the collector of the single logical input transistor to the base of the other of the driver transistors, said logical input circuit means being responsive to low potential logical signals coupled to said single logical input to produce complementary high and low potential level logical pulses which are approximately symmetrical, said first and second complementary logical outputs being connected to the delay lines in said first and second clock gating circuits, respectively, to pass and thereby provide delayed complementary high and low potential level logical pulses which are delayed for a time interval approximately equal to the time period of a high potential level gating pulse applied to the gating pulse inputs, whereby the combination of the delayed high potential level logical pulse and a high potential level gating pulse at the delayed logical pulse and gating pulse inputs of only a predetermined one of the logical gates produces a triggering signal for triggering the flip-flop circuit into a state corresponding to the low logical potential level of the signal coupled to said signal logical input prior to the gating pulse.

References Cited in the file of this patent

UNITED STATES PATENTS

| | | |
|---|---|---|
| 2,706,811 | Steele | Apr. 19, 1955 |
| 3,016,469 | Barrett | Jan. 9, 1962 |
| 3,031,588 | Hilsenrath | Apr. 24, 1962 |